United States Patent
Ono et al.

(10) Patent No.: US 9,816,153 B2
(45) Date of Patent: *Nov. 14, 2017

(54) HIGH STRENGTH STEEL SHEET AND METHOD OF MANUFACTURING THE SAME

(75) Inventors: Yoshihiko Ono, Tokyo (JP); Kenji Takahashi, Tokyo (JP); Kaneharu Okuda, Tokyo (JP); Yusuke Fushiwaki, Tokyo (JP); Michitaka Sakurai, Tokyo (JP)

(73) Assignee: JFE Steel Corporation, Tokyo (JP)

(*) Notice: Subject to any disclaimer, the term of this patent is extended or adjusted under 35 U.S.C. 154(b) by 723 days.

This patent is subject to a terminal disclaimer.

(21) Appl. No.: 14/345,052

(22) PCT Filed: Sep. 28, 2011

(86) PCT No.: PCT/JP2011/072908
§ 371 (c)(1),
(2), (4) Date: Oct. 13, 2014

(87) PCT Pub. No.: WO2013/046476
PCT Pub. Date: Apr. 4, 2013

(65) Prior Publication Data
US 2015/0047751 A1    Feb. 19, 2015

(51) Int. Cl.
*C21D 8/02* (2006.01)
*C22C 38/38* (2006.01)
(Continued)

(52) U.S. Cl.
CPC .......... *C21D 8/0263* (2013.01); *B32B 15/013* (2013.01); *C21D 8/0236* (2013.01);
(Continued)

(58) Field of Classification Search
CPC ... C22C 38/00; C22C 38/38; C21D 2211/005; C21D 8/0263
(Continued)

(56) References Cited

U.S. PATENT DOCUMENTS

| 4,445,946 A | 5/1984 | Takahashi et al. |
| 8,636,852 B2 * | 1/2014 | Ono ......................... C21D 6/00 148/320 |

(Continued)

FOREIGN PATENT DOCUMENTS

| CA | 2750890 | 8/2010 |
| CA | 2768825 | 2/2011 |

(Continued)

OTHER PUBLICATIONS

International Search Report dated Dec. 20, 2011, application No. PCT/JP2011/072908.

(Continued)

*Primary Examiner* — Weiping Zhu
(74) *Attorney, Agent, or Firm* — RatnerPrestia

(57) ABSTRACT

A high strength steel sheet is formed of steel having the composition containing by mass % over 0.015% and less than 0.100% C, less than 0.50% Si, over 1.0% and less than 2.0% Mn, 0.05% or less P, 0.03% or less S, 0.01% or more and 0.3% or less sol. Al, 0.005% or less N, less than 0.35% Cr, 0.0010% or more and 0.0050% or less B, less than 0.15% Mo, less than 0.030% Ti, and iron and unavoidable impurities as a balance, wherein the steel satisfies 2.1≤[Mneq]≤3.1, the microstructure of the steel includes a ferrite and a second phase, a volume fraction of the second phase is set to 2.0 to 12.0%, a total ratio of a volume fraction of martensite and a volume fraction of retained γ to the volume fraction of second phase is 60% or more, and the number of carbides which are present within ferrite particles, have an aspect ratio of 3.0 or less and have a diameter of 0.25 to 0.90 μm is set to 10000 pieces/mm² or less.

8 Claims, 2 Drawing Sheets

(51) Int. Cl.

| | | |
|---|---|---|
| C22C 38/00 | (2006.01) | |
| C22C 38/02 | (2006.01) | |
| C22C 38/04 | (2006.01) | |
| C22C 38/06 | (2006.01) | |
| C22C 38/22 | (2006.01) | |
| C22C 38/28 | (2006.01) | |
| C22C 38/32 | (2006.01) | |
| C21D 11/00 | (2006.01) | |
| C22C 38/24 | (2006.01) | |
| C22C 38/26 | (2006.01) | |
| C22C 38/42 | (2006.01) | |
| C22C 38/50 | (2006.01) | |
| C22C 38/54 | (2006.01) | |
| C22C 38/58 | (2006.01) | |
| C22C 38/60 | (2006.01) | |
| B32B 15/01 | (2006.01) | |
| C22C 18/00 | (2006.01) | |
| C22C 18/04 | (2006.01) | |
| C23C 2/06 | (2006.01) | |
| C23C 2/28 | (2006.01) | |
| C23C 2/40 | (2006.01) | |

(52) U.S. Cl.
CPC ......... *C21D 8/0273* (2013.01); *C21D 8/0284* (2013.01); *C21D 11/00* (2013.01); *C22C 18/00* (2013.01); *C22C 18/04* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/42* (2013.01); *C22C 38/50* (2013.01); *C22C 38/54* (2013.01); *C22C 38/58* (2013.01); *C22C 38/60* (2013.01); *C23C 2/06* (2013.01); *C23C 2/28* (2013.01); *C23C 2/40* (2013.01); *C21D 8/0226* (2013.01); *C21D 2211/003* (2013.01); *C21D 2211/005* (2013.01); *C21D 2211/008* (2013.01)

(58) Field of Classification Search
USPC ........................................................ 148/603
See application file for complete search history.

(56) References Cited

U.S. PATENT DOCUMENTS

| | | | | |
|---|---|---|---|---|
| 9,028,973 B2* | 5/2015 | Takahashi | ............ | C21D 8/0226 |
| | | | | 428/659 |
| 9,039,847 B2* | 5/2015 | Ono | ..................... | C21D 8/0236 |
| | | | | 148/320 |
| 9,255,318 B2* | 2/2016 | Ono | ......................... | C21D 9/46 |
| 9,297,060 B2* | 3/2016 | Ono | ......................... | C21D 6/00 |

FOREIGN PATENT DOCUMENTS

| | | | |
|---|---|---|---|
| EP | 1516937 A1 | 3/2005 | |
| EP | 2392683 | 12/2011 | |
| JP | 57-527945 B2 | 12/1982 | |
| JP | 2001-073074 A | 3/2001 | |
| JP | 2001-207237 A | 7/2001 | |
| JP | 2002004018 A | 1/2002 | |
| JP | 2004197156 A | 7/2004 | |
| JP | 2004211200 A | 7/2004 | |
| JP | 3613129 B2 | 1/2005 | |
| JP | 2007-211338 A | 8/2007 | |
| JP | 2009102714 | 5/2009 | |
| JP | 2009518541 A | 5/2009 | |
| JP | 2009-174019 A | 8/2009 | |
| JP | 2010502845 A | 1/2010 | |
| JP | 2010196159 | 9/2010 | |
| WO | 2004001084 A1 | 12/2003 | |
| WO | 2007067014 A1 | 6/2007 | |
| WO | 2008082146 A1 | 7/2008 | |
| WO | WO 2010/087529 A1 | 8/2010 | |
| WO | WO 2011/013838 A1 | 2/2011 | |

OTHER PUBLICATIONS

Chinese Office Action dated Aug. 31, 2016 for Chinese Application No. 201180073836.9, including Concise Statement of Relevance, 18 pages.
Decision to Grant dated Aug. 9, 2016 for Korean Application No. 10-2014-7010264, including translation, 2 pages.
European Search Report dated Oct. 5, 2015 for European Application No. 11873194.2.
Chinese Office Action for Chinese Application No. 201180073836.9, dated Apr. 5, 2017, with Concise Statement of Relevance of Office Action—10 Pages.
Japanese Office Action with partial English language translation for Application No. JP 2010171287, dated Mar. 4, 2014, 4 pages.

* cited by examiner

[FIG.1]
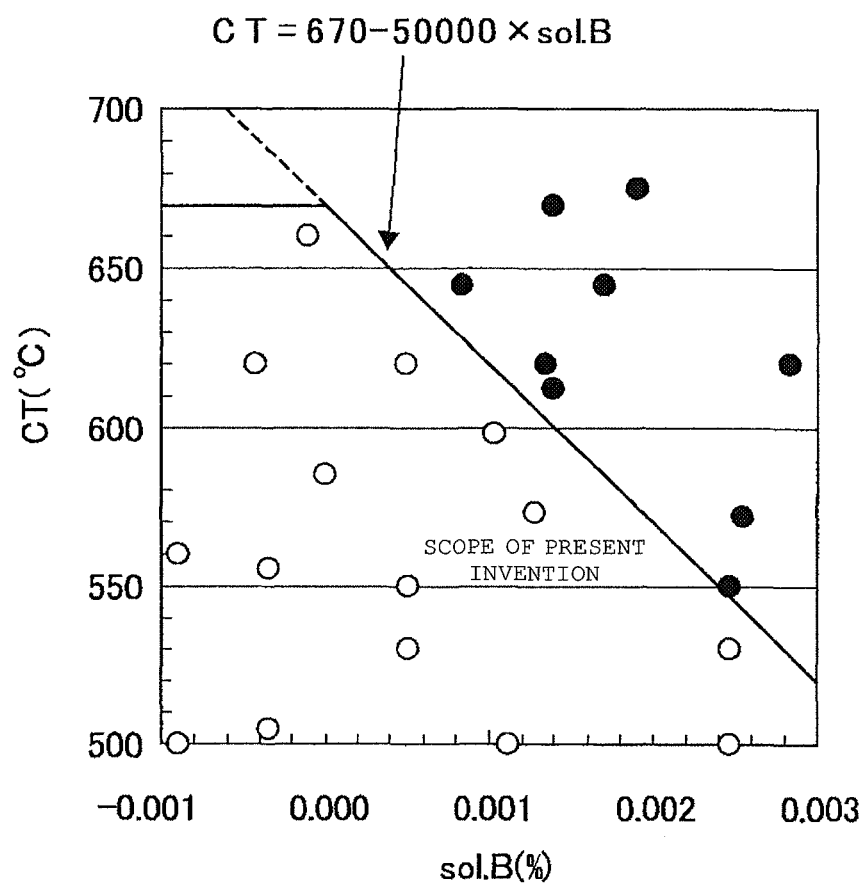

[FIG.2]
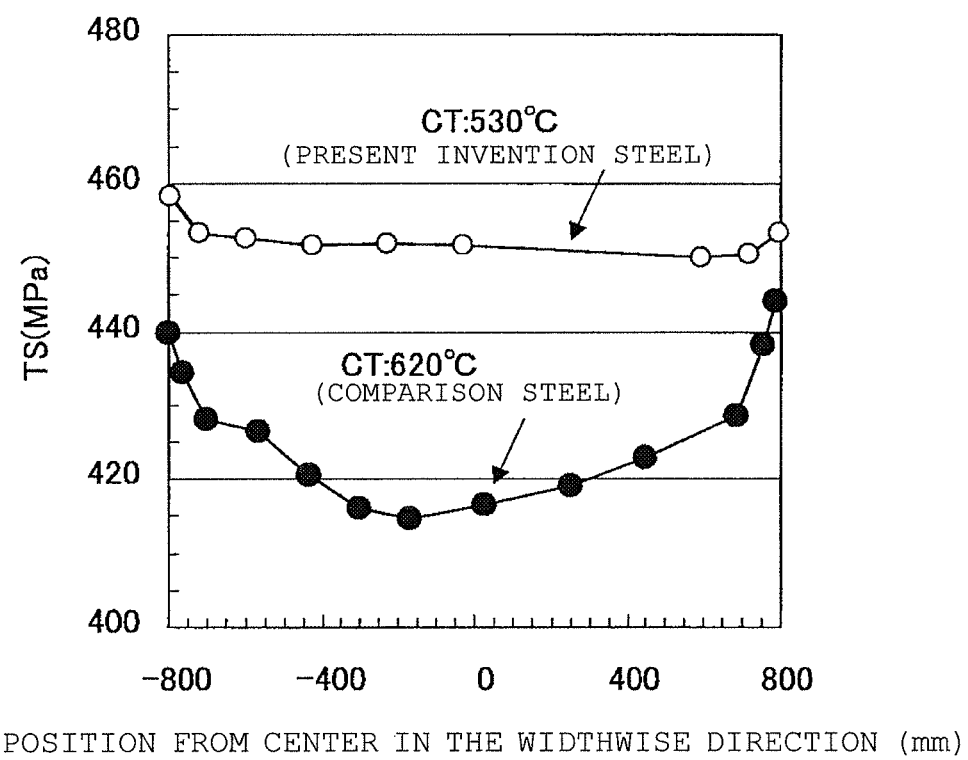
POSITION FROM CENTER IN THE WIDTHWISE DIRECTION (mm)

HIGH STRENGTH STEEL SHEET AND METHOD OF MANUFACTURING THE SAME

CROSS REFERENCE TO RELATED APPLICATIONS

This is the U.S. National Phase application of PCT International Application No. PCT/JP2011/072908, filed Sep. 28, 2011, the disclosure of which is incorporated herein by reference in its entirety for all purposes.

FIELD OF THE INVENTION

The present invention relates to a high strength steel sheet for press forming used through a press forming step in manufacturing automobiles, household electric appliances and the like, and a method for manufacturing the same.

BACKGROUND OF THE INVENTION

Conventionally, as a material of an automotive outer panel which is required to exhibit excellent dent resistance such as a hood, a door, a trunk lid, a back door or a fender, a BH steel sheet of TS:340 MPa class (baking hardening type steel sheet, hereinafter simply referred to as 340BH) has been used. 340BH is ferrite single-phase steel where a solid solution C content in extremely low carbon steel having less than 0.01 mass % C is controlled with the addition of a carbide or nitride forming element such as Nb or Ti, and solid solution strengthening is performed by Si, Mn or P. In recent years, from the further demand for the weight reduction of automotive bodies, various investigations have been carried out to increase the strength of the exposure panels to which the 340BH has been applied, to achieve a reduction in the thickness of the steel sheet, a weight reduction in the R/F (Reinforcement: inner reinforcement parts) with the same thickness of outer panels, a reduction in the temperature and the time in a bake coating process, and the like.

However, if large amounts of Si, Mn, and P are further added to the conventional 340BH in order to increase the strength thereof, surface distortion of pressed parts considerably deteriorates due to the increase in YP. In this case, the surface distortion indicates minute wrinkles and/or undulated patterns which are likely to occur on a press-formed surface, such as a periphery of a door knob portion. Since the surface distortion remarkably degrades the appearance quality of automobiles, steel sheet applied to the exposure panels is required to have low yield stress before press forming which is close to YP of the present 340BH while the strength of a press-formed product is increased. In the same manner, when TS of a material changes, the amount of spring back of the pressed parts change thus inducing the generation of the surface distortion. Accordingly, to decrease the surface distortion, it is also necessary to decrease a change in TS in a coil in addition to the suppression of YS at a low value.

Further, a steel sheet used in such an application is also required to exhibit excellent stretch-formability and high ductility (El) in a coil stably.

Further, such a steel sheet used for manufacturing an automobile body outer panel part is also required to exhibit excellent corrosion resistance. That is, when a dent or a scratch is formed on a steel sheet by a stone scattered during traveling of an automobile, rust is liable to occur in such a portion and become a cause of forming a hole in the portion. To suppress such corrosion, it is necessary for the steel sheet to exhibit the excellent chipping resistance equal to or more than the chipping resistance of conventional 340BH.

Under such a background, for example, patent document 1 discloses a method of acquiring a galvannealed steel sheet which exhibits both low yield stress (YP) and high ductility (El) by forming the composite microstructure mainly constituted of ferrite and martensite by properly setting a cooling rate after annealing steel containing 0.005 to 0.15% C, 0.3 to 2.0% Mn and 0.023 to 0.8% Cr.

Patent document 2 discloses a method of acquiring a steel sheet which exhibits excellent ductility and high BH by containing by mass % 0.005 to 0.04% C, 1.0 to 2.0% Mn, 0.10% or less P, 0.03% or less S, 0.01 to 0.1% Al, less than 0.008% N, and 0.2 to 1.0% Cr while satisfying Mn+1.29Cr being 2.1 to 2.8, and by having the microstructure comprising ferrite and a 3.0% or more and less than 10% of martensite in a volume fraction.

Further, patent document 3 discloses the acquisition of a steel sheet which exhibits YP of 300 MPa or less thus exhibiting excellent ductility (El) and stretch-flangeability (hole expanding ratio, $\lambda$) by setting a sum of contents of Mn, Cr and Mo in a steel containing by mass % 0.02 to 0.033% C, 1.5 to 2.5% Mn, 0.03 to 0.5% Cr and 0 to 0.5% Mo to 1.8 to 2.5%.

Patent document 4 discloses the acquisition of a high strength cold rolled steel sheet which is excellent in baking hardening property and room-temperature aging resistance by controlling a composition range of C and Mn to C+Mn/20≥0.12% in a steel containing by mass % 0.03 to 0.09% C, 1.0 to 2.0% Mn, 0.005 to 0.1% sol. Al, 0.001 to 0.003% B.

Further, patent document 5 discloses a technique which decreases a change in material in a coil by decreasing a precipitation quantity of fine AlN by controlling a composition range of N and B to N−14/11B≤10 (ppm) in a cold rolled mild steel sheet containing by weight % C≤0.05%, Mn≤0.5%, N≤0.005% and B≤0.005%.

PATENT DOCUMENT

[Patent document 1] JP-B-57-57945
[Patent document 2] JP-A-2007-211338
[Patent document 3] Japanese Patent 3613129
[Patent document 4] JP-A-2009-174019
[Patent document 5] JP-A-2001-73074

SUMMARY OF THE INVENTION

The steel sheets described in the above-mentioned patent documents 1 to 4 are formed of a composite microstructure steel sheet where a proper quantity of a second phase mainly constituted of martensite is dispersed in the ferrite by adding a large quantity of Mn and a large quantity of Cr compared to a conventional 340BH, and have several drawbacks described below.

Firstly, many steel sheets described in patent documents 1 to 3 are remarkably inferior to the conventional 340 MPa steel (340BH) with respect to chipping resistance. For example, a part which simulates a door was prepared using a composite microstructure steel sheet containing 0.6% Cr, and broken stones are sprayed to a surface of the steel sheet, and the corrosion resistance of the steel sheet was evaluated. It was found that a maximum pitting depth became approximately 2 times as large as a maximum pitting depth in conventional 340 MPa steel (340BH). That is, although such steel sheets are excellent in press formability, a pitting lifetime is lowered to approximately half of a pitting lifetime of the conventional steel sheet and hence, the application of such steel sheets to an actual vehicle is difficult.

Further, although steels having the chemical compositions described in patent documents 1 to 4 have the composite microstructure, some steel sheets showed low BH and El or high YS. That is, the further improvement of material quality is necessary with respect to these steel sheets.

On the other hand, among steel sheets described in patent documents 1 to 4, some B-added steel sheets can decrease a quantity of an expensive element such as Mo or Cr and exhibit favorable chipping resistance or chemical conversion treatment. Further, these steel sheets exhibit relatively low YS and relatively high BH. However, it is found that the steel sheets have a drawback that mechanical properties largely change. For example, with respect to a coil containing by mass %, 0.025% C, 1.8% Mn, 0.2% Cr, 0.02% P, 0.06% sol. Al, 0.0025% B and 0.002% N which is obtained in such a manner that a coil is coiled in a hot rolling step at CT:640° C. and, after cold rolling, annealing is applied to the steel sheet at 770° C.×40 sec at CGL. Although the coil has the strength of TS: 460 MPa at an outermost edge portion in the coil widthwise direction, the strength of the coil is lowered to TS: 430 MPa at a center portion in the coil widthwise direction. That is, a change in TS amounting to 30 MPa occurs in the coil widthwise direction. In the same manner, a change in TS amounting to approximately 30 MPa also occurs in the coil lengthwise direction. Further, in such a coil, El also changes by 3% in the coil corresponding to the change in TS and hence, in-coil stability of El is remarkably deteriorated thus deteriorating stability in press formability. Further, in such a coil, TS and El exhibit large annealing temperature dependency. This phenomenon occurs in steels to which 0.001% or more B is added aiming the improvement of mechanical properties.

Further, although an attempt was made to use the technique for decreasing a change in mechanical properties described in patent document 5 in the composite microstructure steel sheet to which B is added, the change in mechanical properties cannot be decreased.

As set forth above, it is difficult for the methods disclosed in the above-mentioned patent documents to acquire a steel sheet which exhibits excellent chipping resistance, exhibits also low YP, high BH and high El and, further, exhibits small fluctuations in the mechanical properties.

The present invention has been made to overcome such drawbacks and provides, at a low cost, a high strength steel sheet which exhibits excellent chipping resistance, low YP, high BH and high El and, further, exhibits a small change in mechanical properties in a coil, and a method for manufacturing the steel sheet.

The inventors of the present invention have extensively studied a technique by which low YP, high BH, high El and the reduction of change in mechanical properties can be achieved simultaneously while improving chipping resistance with respect to a conventional composite microstructure steel sheet having a low yield strength, and have acquired the following conclusion.

(I) The chipping resistance can be largely improved by decreasing the content of Cr to less than 0.35% and the content of P to 0.05% or less. Due to such improvement of the chipping resistance, the steel sheet can acquire the chipping resistance substantially equal to or more than chipping resistance of conventional 340 MPa steel (340BH).

(II) To acquire low YP, high BH and high El properties, firstly, it is important that steel sheet has the microstructure constituted of ferrite and a second phase of a small volume ratio, pearlite and bainite in the second phase are suppressed, and a ratio between martensite and remained γ is increased. Accordingly, it is necessary for the steel sheet to contain predetermined amount of Mn, Mo, Cr, P, B and the like which are elements for enhancing hardenability. Then, to acquire the enhancement of BH while acquiring the further lowering of YP and further increase of El, it is necessary to leave a predetermined amount of solid solution C in the steel sheet while making the ferrite grains and the second phase uniformly coarse. It is desirable to positively use Cr, P, B while decreasing Mn, Mo among the hardening elements. However, to acquire both the above-mentioned properties together with the chipping resistance, it is necessary to avoid excessive addition of Cr and P, and it is most desirable to use B at maximum among the above-mentioned elements.

(III) Although addition of 10 ppm or more of B improves mechanical properties of the steel sheet, fluctuations in the mechanical properties become conspicuous to the contrary.

Such a change in material quality occurs because B in a solid solution state remains in a hot-rolled sheet thus generating hardly-solid-soluble carbide. The change in mechanical properties can be decreased by suppressing the generation of such carbide. Further, the carbide can be decreased by selecting a proper coiling temperature corresponding to an amount of N, an amount of Ti, an amount of sol.Al, and an amount of B in steel.

That is, in steel containing 10 ppm or more of B, from a viewpoint of acquiring low YP and high BH, a trace amount of solid solution B which is not combined with N exists just after the steel is coiled in hot rolling process. In another case, in steel containing some amount of sol. Al, AlN precipitates during slow cooling of a coil after coiling thus generating solid solution B. When solid solution B is generated in this manner, it forms stable carbide with Fe, Mn and C during cooling of coiling process.

Further, a generation amount of such carbide conspicuously changes depending on a hot rolling condition such as a coiling temperature. Carbide is extremely stable compared to cementite ($Fe_3C$) and hence, carbide remains in a state of precipitates even at the time of completion of annealing, and a generation amount of martensite is remarkably decreased at a portion of the coil where a generation amount of carbide is large. As a result, it is found that in a composite microstructure steel to which B is added, a change in mechanical properties in the coil remarkably occurs. Such a phenomenon is a phenomenon which is not recognized in a conventional cold-rolled mild steel sheet which does not contain martensite as the strengthening microstructure.

Accordingly, to obviate such a phenomenon, an amount of solid solution B in a hot rolled sheet should be decreased or the generation of stable carbide should be suppressed even when a trace amount of solid solution B is remained. Inventors have found that, for this end, a coiling temperature is properly controlled with respect to an amount of solid solution B which is generated corresponding to an amount of N, an amount of Ti, an amount of sol. Al, and an amount of B.

The present invention has been made based on such findings, and the gist of the present invention includes the following.

[1] A high strength steel sheet having the composition containing by mass % over 0.015% and less than 0.100% C, less than 0.50% Si, over 1.0% and less than 2.0% Mn, 0.05% or less P, 0.03% or less S, 0.01% or more and 0.3% or less sol. Al, 0.005% or less N, less than 0.35% Cr, 0.0010% or more and 0.0050% or less B, less than 0.15% Mo, less than 0.030% Ti, and iron and unavoidable impurities as a balance, wherein the steel satisfies $2.1 \leq [Mneq] \leq 3.1$, the microstructure of the steel includes a ferrite and a second phase, a volume fraction of the second phase is set to 2.0 to 12.0%, a ratio of total volume fraction of martensite and retained γ to the volume fraction of second phase is 60% or more, and the number of existing carbide particles which are present within ferrite grains, have an aspect ratio of 3.0 or less and have a diameter of 0.25 to 0.90 μm is set to 10000 pieces/mm² or less.

Here,

[Mneq]=[% Mn]+1.3[% Cr]+3.3[% Mo]+8[% P]+150B*,

B*=[% B]+[% Ti]/48×10.8×0.9+[% Al]/27×10.8× 0.025,

[% Mn], [% Cr], [% Mo], [% P], [% B], [% Ti] and [% Al] indicate contents of Mn, Cr, Mo, P, B, Ti and sol.Al respectively, and B*=0.0022 when B* satisfies B*≥0.0022.

[2] The high strength steel sheet described in [1], wherein the steel further contains by mass % at least one component selected from a group consisting of less than 0.030% Nb, 0.2% or less V, 0.15% or less W and 0.1% or less Zr.

[3] The high strength steel sheet described in [1] or [2], wherein the steel further contains by mass % at least one component selected from a group consisting of 0.2% or less Sn, 0.2% or less Sb, 0.5% or less Cu, 0.5% or less Ni, 0.01% or less Ca, 0.01% or less Ce, 0.01% or less La and 0.01% or less Mg.

[4] A method for manufacturing a high strength steel sheet, wherein in a hot-rolling process a slab having the composition described in any one of [1] to [3], a coiling temperature CT is controlled within a range expressed by a formula (1) corresponding to sol. B and, after performing cold rolling at a cold rolling reduction of 50 to 85%, and in a continuous galvanizing and galvannealing line (CGL) or continuous annealing line (CAL), annealing is performed by holding a cold-rolled sheet at an annealing temperature of 740° C. or above and 830° C. or below for 25 seconds or more.

CT(° C.)≤670−50000×sol.B     formula (1)

Here, sol.B=[% B]−{[% N]/14−[% Ti]/48×0.8−[% Al]/27× 0.0005×(CT−560)}×10.8     formula (A)

In the formula (A), [% B], [% N], [% Ti], and [% Al] indicate contents of B, N, Ti and sol. Al respectively, and CT indicates a coiling temperature (° C.). When CT−560≤0, CT−560 is assumed as 0, and the calculation is made by assuming sol. B as 0 when sol. B≤0.

According to the present invention, the high strength steel sheet exhibiting excellent chipping resistance, low YP, and high BH and El and, further, a small change in mechanical properties within a coil can be manufactured at a low cost. The high strength steel sheet of the present invention exhibits all of excellent corrosion resistance, excellent surface distortion resistance, excellent stretch-formability, excellent dent resistance and excellent mechanical properties' stability and hence, the high strength steel sheet can be used for increasing strength of an automobile part and for decreasing a thickness of the automotive part.

BRIEF DESCRIPTION OF THE DRAWINGS

FIG. 1 is a view showing the relationship between sol. B and CT and a change in TS in the widthwise direction.

FIG. 2 is a view showing a change in the TS in the coil widthwise direction of steel sheets which differ in CT from each other.

DETAILED DESCRIPTION OF EMBODIMENTS OF THE INVENTION

The present invention is explained in detail hereinafter with reference to selected embodiments. The % expressing amount of content means mass % unless otherwise specified.
1) Composition of Steel
Cr: Less than 0.35%

Cr decreases YP and increases El due to an effect where a predetermined amount of martensite is generated by enhancing hardenability and an effect which uniformly disperses martensite without making ferrite grains fine and hence, Cr is a desirable element to be added in terms of improving mechanical properties. However, the addition of Cr remarkably deteriorates chipping resistance. Accordingly, to ensure favorable chipping resistance, it is necessary to set the content of Cr to less than 0.35%. To impart further excellent chipping resistance to the steel, the content of Cr is desirably set to less than 0.30%. Cr is an element which can be arbitrarily added from a viewpoint of properly setting [Mneq] described below and hence, a lower limit is not defined (including Cr: 0%). However, from a viewpoint of acquiring low YP, the content of Cr is preferably set to 0.02% or more, and the content of Cr is more preferably set to 0.05% or more.
[Mneq] 2.1 or More and 3.1 or Less To ensure low YP, high El, high BH and also excellent anti-aging property, it is necessary for the steel to exhibit, at least as the steel microstructure, the composite microstructure which has the second phase including martensite and retained γ while having ferrite as main microstructure. With respect to conventional steel, there are many steel sheets having high YP and many steel sheets having low El. As the result of investigation of the reason, it becomes apparent that, in these steel sheets, pearlite and bainite are generated in addition to martensite and a small amount of retained γ as a second phase in these steel sheets.

Pearlite and bainite are fine grains having a diameter of approximately 1 to 2 μm and are generated adjacent to martensite. Accordingly, even when a sample which is etched with natal and LePera corrosive solution, for example, is observed with an optical microscope, it is difficult to distinguish pearlite and bainite as microstructures different from martensite and hence, it is necessary to observe pearlite and bainite using an SEM at magnification of 3000 times or more to strictly distinguish pearlite and bainite as microstructures different from martensite. For example, to investigate in detail the microstructure of conventional 0:03% C–1.5% Mn–0.5% Cr steel, only coarse pearlite is distinguished in the observation using an optical microscope or in the observation using an SEM at magnification of approximately 1000 times, and a volume fraction of pearlite or bainite which occupies in a volume fraction of a second phase is measured to be approximately 10%, while to investigate the microstructure of the steel using the SEM observation at magnification of 3000 times, a ratio of volume fraction of pearlite or bainite which occupies in a volume fraction of the second phase becomes 30 to 40%. Low YP and high El can be simultaneously acquired by suppressing such pearlite or bainite.

In heat cycles of CGL or CAL where a cooling rate in primary cooling from an annealing temperature to a temperature around 480° C. after annealing (cooling until plating bath immersion in CGL, for example) or in secondary cooling from 480° C. to a temperature around 350° C. (cooling after plating bath immersion in CGL and cooling until a overaging zone in CAL, for example) is set to 1 to 200° C./sec, to sufficiently decrease fine pearlite or bainite, weighting equivalent formulae of respective elements described below relating to hardenability may be controlled to 2.1 to 3.1. However, when B is added in combination with Ti and Al, although a hardenability enhancing effect is remarkably increased, the hardenability enhancing effect is saturated even when B is added in excess of a predetermined amount. Accordingly, these effects are expressed by following formulae.

[Mneq]=[% Mn]+1.3[% Cr]+3.3[% Mo]+8[% P]+150B*

B*=[% B]+[% Ti]/48×10.8×0.9+[% Al]/27×10.8× 0.025

When B* satisfies B*≥0.0022, B is assumed as B*=0.0022. Here, [% Mn], [% Cr], [% Mo], [% P], [% B], [% Ti] and [% Al] indicate contents of Mn, Cr, Mo, P, B, Ti and sol.Al respectively.

A hardenability enhancing effect attributed to B is saturated when B* is 0.0022 or more and hence, B* is set to 0.0022.

By setting [Mneq] to 2.1 or more, it is possible to acquire low YP, high El and high BH. Further, from a viewpoint of acquiring low YP and high El, [Mneq] is desirably set to 2.2 or more, and is more desirably set to 2.3 or more. When [Mneq] exceeds 3.1, an addition amount of Mn, Cr and P becomes excessively large so that it becomes difficult for the steel to ensure sufficiently low YP and excellent chipping resistance simultaneously. Accordingly, [Mneq] is set to 3.1 or less.

Mn: Over 1.0% and Less than 2.0%

To further lower YP and to ensure higher El and higher BH, the content of Mn may preferably be small even when the steel composition has the same Mn equivalent. This is because when the content of Mn is excessively large, an α→γ transformation temperature in an annealing process becomes low and hence, γ grains are generated before the completion of recrystallization so that the microstructure becomes non-uniform microstructure where ferrite grains and the second phase are partially made fine whereby YP is elevated and El is lowered, and an amount of solid solution C after annealing is decreased so that BH is decreased. From a viewpoint of acquiring low YP, high El and high BH, an amount of Mn is set to less than 2.0%. On the other hand, when the amount of Mn is excessively small, it becomes difficult to ensure sufficient hardenability even when a large amount of other element is added. Further, a large number of MnS are finely dispersed in steel so that corrosion resistance and chipping resistance are deteriorated. To ensure sufficient hardenability and sufficient corrosion resistance, it is necessary to set the content of Mn to at least over 1.0%.

Accordingly, the amount of Mn is set to over 1.0% and less than 2.0%. From a viewpoint of further improving corrosion resistance and chipping resistance, the amount of Mn is desirably set to 1.2% or more.

Mo: Less than 0.15%

Mo can be added to the steel from a viewpoint of ensuring predetermined strength by suppressing the generation of pearlite by enhancing hardenability. However, in the same manner as Mn, Mo has a strong action of making the second phase fine, and also has a strong action of making ferrite grains fine. Accordingly, when Mo is excessively added, YP is remarkably increased. Further when the Mo is used for manufacturing a cold rolled steel sheet, chemical conversion treatment property is remarkably deteriorated. Further, Mo is an extremely expensive element. Accordingly, from a viewpoint of lowering YP, improving chemical conversion treatment property and lowering cost, an addition amount of Mo is limited to less than 0.15% (including 0%). From a viewpoint of acquiring further lower YP, the addition amount of Mo is desirably set to 0.05% or less and, further, it is preferable that Mo is not added (0.02% or less).

P: Less than 0.05%

P is used as a hardenability element in the present invention, and is an element which enables the steel sheet to acquire low YP, high BH and high El by making use of P as an element which substitutes Mn, Cr, Mo. That is, P exhibits a large hardenability enhancing effect even when a trace amount of P is added to the steel, and an effect of uniformly dispersing a second phase to a triple point of ferrite grain boundaries. Accordingly, YP is lowered more and BH becomes higher using P than Mn when [Mneq] is same.

Further, with the addition of P, El is also increased. To acquire the above-mentioned effects of acquiring low YP, high BH and high El with the addition of P, the content of P is preferably set to 0.015% or more.

However, when P is added to the steel in excess of 0.05%, a hardenability enhancing effect, the acquisition of uniform microstructure and an effect of making grains coarse are saturated, and a solid solution strengthening amount becomes excessively large and hence, low YP cannot be acquired. Further, an alloying reaction between matrix and plating layer is remarkably delayed so that powdering resistance is deteriorated whereby chipping resistance is deteriorated eventually. Accordingly, the content of P is set to 0.05% or less.

B: 0.0010% or More and 0.0050% or Less

B has an action of making ferrite grains and martensite grains uniform and coarse and an action of suppressing pearlite by enhancing hardenability. Further, B per se has an action of increasing BH. Accordingly, by replacing Mn with B while ensuring predetermined amount of [Mneq], both the acquisition of low YP and the acquisition of high BH can be realized simultaneously. To sufficiently acquire such effects, it is necessary to add 0.0010% or more B to the steel. However, when B is added to the steel in excess of 0.0050%, castability and rolling property are remarkably lowered. Accordingly, the content of B is set to 0.0050% or less. To enhance the effect brought about by the acquisition of low YP and the acquisition of high BH attributed to the addition of B, the content of B is preferably set to 0.0013% or more.

C: 0.015% or More and Less than 0.100%

C is an element necessary for ensuring a predetermined amount of volume fraction of a second phase. When the content of C is small, the second phase is not formed, and YP is remarkably increased, and balance between strength and ductility is deteriorated. Further, the steel cannot acquire high BH and excellent anti-aging property and the like. To acquire sufficiently low YP by ensuring a predetermined amount of volume fraction of the second phase, it is necessary to set the content of C to over 0.015%. It is desirable to set the content of C to 0.02% or more from a viewpoint of improving anti-aging property and of further decreasing YP. On the other hand, when the content of C becomes 0.100% or more, a volume fraction of the second phase becomes excessively large and hence, YP is increased and El and BH are lowered. Further, the excessively large content of C also deteriorates weldability. Accordingly, the content of C is set to less than 0.100%. To ensure high El and high BH while acquiring the further lowering of YP, the content of C is preferably set to 0.060% or less, and is more preferably set to less than 0.040%.

Si: Less than 0.50%

Si has, with the addition of a trace amount thereof, an effect of improving surface quality by delaying the generation of a scale in hot rolling, an effect of properly delaying an alloying reaction between a matrix and zinc during a plating bath or alloying treatment, an effect of acquiring low YR and high El by making the microstructure of a steel sheet more uniform and coarser and hence, Si can be added from such a viewpoint. However, when Si is added to the steel 0.50% or more, a scale pattern or non-plating occurs on a galvanized steel sheet, and a scale pattern occurs on a cold-rolled steel sheet and hence, the application of such steel sheets to an outer panel becomes difficult. Further, the chemical conversion treatment property is deteriorated, and YP is elevated by excessive addition of Si. Accordingly, the content of Si is set to less than 0.50%. Further, from a viewpoint of improving surface quality and decreasing YP, the content of Si is preferably set to less than 0.30%. Si is an element which can be arbitrarily added and hence, a lower limit is not defined (including Si: 0%). However, from the above-mentioned viewpoints, the content of Si is preferably set to 0.01% or more, and the content of Si is more preferably set to 0.02% or more.

S: 0.03% or Less

S has, with the addition of a proper amount thereof, an action of improving primary-scale peeling performance of a steel sheet and an action of improving appearance quality of a cold-rolled steel sheet and a galvanized steel sheet and hence, S can be contained in a steel sheet. However, when the content of S is large, MnS which precipitates in the steel becomes excessively large thus lowering the elongation and the stretch-flangeability of the steel sheet. Further, hot working ductility of a slab during hot rolling is lowered and hence, a surface defect is liable to occur. Further, the excessive content of S lowers corrosion resistance. Accordingly, the content of S is set to 0.03% or less. From a viewpoint of improving stretch-flangeability and corrosion resistance, the content of S is desirably set to 0.02% or less, and the content of S is more desirably set to 0.01% or less.

Sol. Al: 0.01% or More and 0.3% or Less

Al is added for enhancing a hardenability enhancing effect of B by fixing N, for improving anti-aging property and for improving surface quality by decreasing inclusions. The content of sol. Al is set to 0.01% or more from a viewpoint of enhancing the hardenability enhancing effect and the anti-aging property of B. To exhibit such effects more, the content of sol. Al is desirably set to 0.015% or more, and the content of sol. Al is more preferably set to 0.04% or more. On the other hand, when sol. Al is added in excess of 0.3%, an effect of leaving solid solution B and an effect of improving anti-aging property are saturated thus wastefully pushing up a cost. Further, castability is deteriorated thus deteriorating surface quality. Accordingly, the content of sol. Al is set to 0.3% or less. The content of sol. Al is desirably set to less than 0.2% from a viewpoint of ensuring excellent surface quality.

N: 0.005% or Less

N is an element which forms nitride such as BN, AlN or TiN in the steel, and has a drawback that an effect of B of improving mechanical properties is dissipated through the formation of BN. Further, N forms fine AlN thus lowering grain growth property whereby YP is elevated. When the content of N exceeds 0.005%, YP is elevated and the anti-aging property is also deteriorated and hence, the steel sheet is not sufficiently applicable to an outer panel whereby the content of N is set to 0.005% or less. The content of N is desirably set to 0.004% or less from a viewpoint of further decreasing YP by decreasing a precipitation amount of AlN.

Ti: Less than 0.030%

Ti has an effect of enhancing hardenability of B by fixing N, an effect of improving anti-aging property and an effect of improving castability, and is an element which can be arbitrarily added to acquire such effects as an auxiliary effect. However, Ti has an action that when the content of Ti becomes large, fine precipitates such as TiC or Ti(C, N) are formed in steel so that YP is remarkably elevated and TiC is generated during cooling after annealing thus decreasing BH. Accordingly, when Ti is added, it is necessary to control the content of Ti within a proper range. When the content of Ti is set to 0.030% or more, YP is remarkably increased. Accordingly, the content of Ti is set to less than 0.030%. Ti is an element which can be arbitrarily added and hence, a lower limit is not defined (including Ti: 0%). However, to allow B to exhibit a hardenability enhancing effect by fixing N due to precipitation of TiN, the content of Ti is preferably set to 0.002% or more, and to acquire low YP by suppressing the precipitation of TiC, the content of Ti is desirably set to less than 0.010%.

Although the balance is constituted of iron and unavoidable impurities, predetermined amounts of following elements may be further contained in steel.

At least one kind selected from following V, Nb, W and Zr is added.

V: 0.2% or Less

V can be added from a viewpoint of increasing strength. The content of V is preferably set to 0.002% or more from a viewpoint of increasing strength, and the content of V is more preferably set to 0.01% or more. However, when V is added in excess of 0.2%, a cost is remarkably pushed up. Accordingly, the content of V is desirably set to 0.2% or less.

Nb: Less than 0.030%

Nb has an action of forming the microstructure into fine grains and precipitating NbC, Nb(C, N) thus strengthening a steel sheet whereby Nb can be added from a viewpoint of increasing strength. Further, Nb exhibits a large effect in delaying recrystallization in hot rolling and a large effect in delaying transformations which follow the recrystallization and hence, the addition of a trace amount of Nb has an effect of decreasing a r value in the direction orthogonal to rolling and improving a r value in the direction of 45 degrees by improving the texture. Accordingly, by adding 0.002 to 0.015% Nb, in-plane anisotropy of $\Delta r$ and YP can be made small. From the above-mentioned viewpoint, the content of Nb is preferably set to 0.002% or more, and the content of Nb is more preferably set to 0.005% or more. However, since YP is remarkably elevated when the content of Nb is set to 0.030% or more, the content of Nb is desirably set to less than 0.030%.

W: 0.15% or Less

W can be used as a hardenability element and a precipitation strengthening element. From the above-mentioned viewpoint, the content of W is preferably set to 0.002% or more, and the content of W is more preferably set to 0.005% or more. However, the excessive addition of W brings about the elevation of YP and hence, the content of W is desirably set to 0.15% or less.

Zr: 0.1% or Less

Zr can be also used as a hardenability element and a precipitation strengthening element in the same manner as W. From the above-mentioned viewpoint, the content of Zr is preferably set to 0.002% or more, and the content of Zr is more preferably set to 0.005% or more. However, the excessive addition of Zr brings about the elevation of YP and hence, the content of Zr is desirably set to 0.1% or less.

At least one kind selected from following Sn, Sb, Cu, Ni, Ca, Ce, La and Mg is added.

Sn: 0.2% or Less

The addition of Sn is desirable from a viewpoint of suppressing nitriding or oxidization of a surface of a steel sheet or suppressing decarburization and removal of B in a several-ten micron region of a steel sheet surface layer generated by oxidization. Due to such addition of Sn, fatigue property, anti-aging property, surface quality and the like are improved. From a viewpoint of suppressing nitriding or oxidization, the content of Sn is preferably set to 0.002% or more, and is more desirably set to 0.005% or more. However, when the content of Sn exceeds 0.2%, the elevation of YP and the deterioration of toughness are brought about and hence, the content of Sn is desirably set to 0.2% or less.

Sb: 0.2% or Less

In the same manner as Sn, the addition of Sb is also desirable from a viewpoint of suppressing nitriding or oxidization of a surface of a steel sheet or suppressing decarburization and removal of B in a several-ten micron region of a steel sheet surface layer generated by oxidization. By suppressing such nitriding and oxidization, the decrease in the amount of martensite in the steel sheet surface layer can be prevented, and lowering of hardenability attributed to the decrease of B can be prevented thus improving fatigue property and anti-aging property. Further, plating appearance quality can be enhanced by improving wettability of galvanizing. From a viewpoint of suppressing nitriding and oxidization, the content of Sb is preferably set to 0.002% or more, and the content of Sb is more desirably set to 0.005% or more. However, when the content of Sb exceeds 0.2%, the elevation of YP and the deterioration of toughness are brought about and hence, the content of Sb is desirably set to 0.2% or less.

Cu: 0.5% or Less

Cu slightly enhances chipping resistance and hence, the addition of Cu is desirable from a viewpoint of improving chipping resistance. Further, Cu is an element which is mixed into a raw steel material when scrap is used as a raw material and hence, by allowing the mixing of Cu, a recycled material can be used as a raw material and hence, a manufacturing cost can be reduced. From a viewpoint of improving chipping resistance, the content of Cu is preferably set to 0.01% or more, and the content of Cu is more desirably set to 0.03% or more. However, when the content of Cu becomes excessively large, Cu causes a surface defect and hence, the content of Cu is desirably set to 0.5% or less.

Ni: 0.5% or Less

Ni is also an element having an action of improving chipping resistance. Ni also has an action of decreasing a surface defect which is liable to occur when Cu is contained in steel. Accordingly, from a viewpoint of improving surface quality while improving corrosion resistance, the content of Ni is preferably set to 0.01% or more, and the content of Ni is more desirably set to 0.02% or more. However, when the content of Ni becomes excessively large, the generation of scales in a heating furnace becomes non-uniform so that Ni becomes a cause of a surface defect, and a cost is remarkably pushed up. Accordingly, the content of Ni is set to 0.5% or less.

Ca: 0.01 or Less

Ca has an action of improving chipping resistance by fixing S in steel as CaS and by increasing pH in a corroded product. Further, Ca has an action of improving stretch-flangeability by suppressing the generation of MnS which lowers the stretch-flangeability due to the generation of CaS. From such a viewpoint, the content of Ca is desirably set to 0.0005% or more. However, Ca is liable to be floated and separated as oxide in molten steel and hence, it is difficult to leave a large amount of Ca in steel. Accordingly, the content of Ca is set to 0.01% or less.

Ce: 0.01% or Less

Ce can be also added for improving stretch-flangeability and chipping resistance by fixing S in steel. From the above-mentioned viewpoint, the content of Ce is preferably set to 0.0005% or more. However, Ce is an expensive element and hence, the addition of large amount of Ce pushes up a cost. Accordingly, the content of Ce is desirably set to 0.01% or less.

La: 0.01% or Less

La can be also added for improving stretch-flangeability and chipping resistance by fixing S in steel. From the above-mentioned viewpoint, the content of La is preferably set to 0.0005% or more. However, La is an expensive element and hence, the addition of large amount of La pushes up a cost. Accordingly, the content of La is desirably set to 0.01% or less.

Mg: 0.01% or Less

Mg can be added from a viewpoint of making the microstructure uniform by finely dispersing oxide. From the above-mentioned viewpoint, the content of Mg is preferably set to 0.0005% or more. However, when the content of Mg is large, surface quality is deteriorated. Accordingly, the content of Mg is desirably set to 0.01% or less.

2) Microstructure

The steel sheet microstructure of the present invention contains ferrite which constitutes the main microstructure, martensite, retained $\gamma$, pearlite, bainite and other trace amounts of carbides. A measuring method of these microstructures configurations is firstly explained.

A volume fraction of a second phase is obtained in such a manner that an L cross section (a vertical cross section parallel to the rolling direction) of a steel sheet is polished and, thereafter, is corroded with nital, the cross section is observed in 8 fields of view at a position of ¼ thickness of the steel sheet by an SEM at magnification of 3000 times, and photographed microstructure photos are subjected to an image analysis and an area ratio of the second phase is measured. That is, in the steel sheet of the present invention, the difference in the microstructure configuration is small between the rolling direction and the rolling orthogonal direction and hence, the measured area ratios of the second phase in both directions exhibit the substantially same value whereby the area ratio of the second phase measured in the L cross section is set as a volume fraction of the second phase here.

In the photo of microstructure, a region having a blackish contrast constitutes ferrite. When carbides are generated in a lamellar manner or in a point sequence manner, such a region constitutes pearlite or bainite, and grains with white contrast constitute martensite or retained $\gamma$, and respective area ratios are obtained. However, based on the result of observation by a TEM, grains having a diameter of 0.90 µm or less which are dispersed in ferrite grains out of grains with white contrast are determined as carbide grains described later, and are excluded from a volume fraction of martensite or retained $\gamma$. A volume fraction of the second phase is a total amount of these microstructures, and the volume fraction of martensite or retained $\gamma$ is a total amount of area ratios of regions of white contrast. The discrimination of martensite and retained $\gamma$ using an SEM photograph is difficult.

Although the microstructure is defined based on the total area ratio of both phases here, it is confirmed by an analysis result using X rays that martensite is approximately 60% and retained γ is approximately 40% in the total volume fractions of martensite and retained γ.

When a steel sheet passes an overaging zone of CAL in continuous annealing, after martensite is generated at a temperature of approximately 350° C. or below, the steel sheet is held in the temperature range for a long time and hence, there may be a case where the generated martensite is slightly tempered. This slightly tempered martensite is treated as martensite here. The discrimination between tempered martensite and bainite is performed as follows. That is, carbides in tempered martensite are extremely fine compared to carbides dispersed in bainite and hence, it is possible to discriminate martensite and bainite by measuring average particle sizes of carbides dispersed in individual martensite grains and bainite grains. Here, when the average particle size of carbides in the grains is 0.15 μm or less, the microstructure is determined as tempered martensite, while when the average particle size of carbides in the grains exceeds 0.15 μm, the microstructure is determined as bainite.

From the observation result using the TEM, it is clarified that spherical or elliptical particles having a diameter of approximately 0.5 μm which are dispersed in ferrite grains are carbides of Fe, Mn, C, B system, and these precipitates cause fluctuations in mechanical properties of a B added steel. Accordingly, by determining particles which are distributed in ferrite grains on the SEM photograph, have an aspect ratio of 3.0 or less and have an average particle size of 0.25 to 0.90 μm as carbides of Fe, Mn, C, B system, the number of particles is measured. In case of the elliptical particles on the SEM photograph, a long axis a and a short axis b in the direction orthogonal to the long axis are measured, and $(a \times b)^{0.5}$ is set as an equivalent particle diameter.

volume Fraction of Second Phase: 2.0 to 12.0%

To acquire low YP, it is necessary to set the volume fraction of the second phase to 2.0% or more. However, when the volume fraction of the second phase exceeds 12.0%, YP is elevated and also EL and BH are deteriorated. Accordingly, the volume fraction of the second phase is set to a value which falls within a range of 2.0 to 12.0%. To acquire the further lowering of YP and the further increase of BH, the volume fraction of the second phase is preferably set to 10.0% or less, the volume fraction of the second phase is more preferably set to 8.0% or less, and the volume fraction of the second phase is still more preferably set to 6.0% or less.

Ratio of Total Volume Fraction of Martensite and Retained γ to Volume Fraction of Second Phase: 60% or More To simultaneously ensure low YP and high El by sufficiently suppressing pearlite and bainite in the second phase, it is necessary to set a ratio of volume fraction of martensite and retained γ which occupy the second phase with respect to a volume fraction of second phase to 60% or more.

The number of carbide particles which are present in ferrite grains, and have an aspect ratio of 3.0 or less and a diameter of 0.25 to 0.90 μm: 10000 pieces/mm²

With respect to a steel sheet where the steel composition and a coiling temperature during hot rolling, an annealing temperature and a holding time during annealing are not property set, fluctuations in mechanical properties remarkably occurs in the coil widthwise direction and in the coil longitudinal direction. In such a portion, spherical or elliptical carbides having an aspect ratio of approximately 3.0 or less and a diameter of 0.25 μm or more and 0.90 μm or less are dispersed in ferrite grains in excess of 10000 pieces/mm². The change in mechanical properties in a coil can be substantially eliminated by decreasing such carbides to 10000 pieces/mm² or less. Accordingly, the presence number of carbide particles which are present in ferrite grains and have an aspect ratio of approximately 3.0 or less and a diameter of 0.25 to 0.90 μm are set to 10000 pieces/mm² or less. Although an average ferrite grain diameter and an average diameter of a second phase are not defined with respect to the steel of the present invention, the average ferrite grain diameter is ideally set to a value which falls within a range of 7 to 12 μm, and the average diameter of the second phase is set to a value which falls within a range of 0.8 to 1.3 μm.

Such microstructure configuration is acquired by properly setting the composition range of Mn, Cr, P, B, sol. Al, Ti, N and the like and also by properly setting CT during hot rolling and annealing temperatures and holding times at CAL and CGL.

3) Manufacturing Condition

The steel sheet of the present invention is, as described above, preferably manufactured by the method where a coiling temperature CT is controlled to a proper range corresponding to contents of B, sol. Al, Ti and N in a step of hot rolling using steel slab having the composition limited as described above, and after applying cold rolling to the hot-rolled steel sheet at a cold-rolled reduction of 50 to 85%, in a continuous galvanizing and galvannealing line (CGL) or a continuous annealing line (CAL), the cold-rolled steel sheet is annealed by holding the steel sheet at an annealing temperature of 740° C. or above and 830° C. or below for 25 sec or more.

Hot Rolling:

Hot rolling of steel slab is performed by a method which rolls the slab after heating, a method which directly rolls the slab after continuous casting without heating, a method which rolls the slab by applying heat treatment for a short time to the slab after continuous casting and the like. In hot rolling, for example, slab heating temperature may be set to 1100 to 1300° C., and finish rolling temperature is set to $Ar_3$ transformation temperature to $Ar_3$ transformation temperature +150° C. From a viewpoint of decreasing in-plane anisotropy of an r value as well as from a viewpoint of improving BH, an average cooling rate after hot rolling is desirably set to 20° C./sec or more.

To decrease changes in mechanical properties in a coil with respect to B-added steel which contains 0.0010% or more B, it is necessary to control a coiling temperature to a proper range corresponding to contents of B, sol. Al, Ti and N. The result of investigation carried out with respect to the relationship between respective elements and proper CT is described hereinafter.

5 kinds of steels which differ from each other in contents of B, sol. Al, Ti and N as shown in Table 1 were made. Obtained slabs were subjected to hot rolling thus obtaining hot-rolled coils having a thickness of 3.2 mm. Here, a slab heating temperature was set to 1220° C., and a finishing rolling temperature was set to 850° C. Immediately after rolling, the hot-rolled sheet was rapidly cooled to 690° C. and, thereafter, laminar cooling was applied to the sheet on a run-out table, and was coiled at a temperature which falls within a range of 500 to 675° C. The obtained hot-rolled sheet was subjected to pickling and, thereafter, cold rolling was applied to the hot-rolled sheet until a thickness of the cold-rolled sheet becomes 0.70 mm and, thereafter, annealing was performed at a temperature of 780° C. for 40 sec in a CGL. The sheet was immersed in a zinc plating bath during cooling thus applying plating to the sheet. Subsequently, after applying alloying treatment to the sheet, the sheet was cooled down to a room temperature thus applying skin-pass rolling with an elongation of 0.4% to the sheet. JIS No. 5 tensile specimens were sampled from the obtained coil in the direction parallel to the rolling direction, and mechanical properties of the specimens in the coil widthwise direction were investigated. Further, the metal microstructure was investigated by the method described previously.

TABLE 1

| steel | C | Si | Mn | P | S | sol.Al | N | Cr | Ti | B | Mo | B* | [Mneq] |
|---|---|---|---|---|---|---|---|---|---|---|---|---|---|
| 1 | 0.021 | 0.02 | 1.74 | 0.026 | 0.008 | 0.07 | 0.0032 | 0.18 | 0.006 | 0.0019 | 0 | 0.0022 | 2.51 |
| 2 | 0.024 | 0.01 | 1.80 | 0.025 | 0.007 | 0.07 | 0.0020 | 0.20 | 0 | 0.0012 | 0.01 | 0.0019 | 2.58 |
| 3 | 0.025 | 0.01 | 1.82 | 0.024 | 0.009 | 0.04 | 0.0035 | 0.19 | 0 | 0.0018 | 0.01 | 0.0022 | 2.62 |
| 4 | 0.026 | 0.01 | 1.80 | 0.019 | 0.005 | 0.03 | 0.0025 | 0.24 | 0.005 | 0.0035 | 0 | 0.0022 | 2.59 |
| 5 | 0.022 | 0.01 | 1.71 | 0.015 | 0.004 | 0.06 | 0.0041 | 0.22 | 0.016 | 0.0014 | 0 | 0.0022 | 2.45 |

FIG. 1 shows the result of the investigation where the presence or non-presence of a change in TS in the coil widthwise direction was investigated with respect to respective composition steels where CT was variously changed. Here, sol. B is a value calculated by a formula (A), and is a value which estimates a content of B in a solid solution state in a hot-rolled sheet.

$$\text{sol.B} = [\% B] - \{[\% N]/14 - [\% Ti]/48 \times 0.8 - [\% Al]/27 \times 0.0005 \times (CT-560)\} \times 10.8 \quad (A)$$

[% B], [% N], [% Ti], [% Al] indicate contents of B, N, Ti and sol. Al respectively, and CT indicates a coiling temperature (° C.). CT−560 is assumed as 0 (zero) when CT−560≤0, and sol. B is assumed as 0 (zero) when sol.B≤0.

That is, although it is estimated that an amount of solid solution B is generated when B is excessively added with respect to an N amount, when Ti and Al are added, it is necessary to take precipitation amounts of Ti and Al with respect to an N amount into consideration. 80% of addition amount of Ti precipitates as TiN at the time of heating the slab, and a balance of Ti precipitates as TiC. The precipitation of Al occurs when CT exceeds 560° C., and a precipitation amount of Al is increased along with the increase of CT. The formula (A) is provided by taking such a behavior into consideration, wherein an N amount of a balance which is a value obtained by subtracting an N amount which precipitates as TiN and AlN from a contained N amount is obtained, and an N amount of the balance is subtracted from an added B amount.

In FIG. 1, the relationship among sol. B obtained by the formula (A) in this manner, CT and the presence/non-presence of a change in mechanical properties in the coil width direction was plotted. Change in TS in the widthwise direction was evaluated in such a manner that JIS No. 5 tensile specimen was sampled in the direction parallel to the rolling direction, and a tensile test was applied to the specimen. With respect to a sampling position of the specimen in the coil longitudinal direction, the specimen is sampled at a center position in the coil longitudinal direction. With respect to a sampling position of the specimen in the widthwise direction, sampling was started from a position where a center line of the specimen is 18 mm inside an edge of the coil in the widthwise direction, and sampling was made at intervals of 30 mm to 600 mm in the widthwise direction sequentially such that a change in strength can be sufficiently confirmed. The coil obtained in this manner where the difference between a maximum value and a minimum value of TS in the widthwise direction was less than 20 MPa was indicated by "good" and the coil where the difference between the maximum value and the minimum value was 20 MPa or more is indicated by "bad". In the coil with the condition indicated by "bad", a change in mechanical properties in the coil widthwise direction and the coil longitudinal direction occurred conspicuously. Further, in the drawing, a boundary line obtained by the relationship formula between CT and sol. B expressed by the formula (1) is also indicated.

$$CT(° C.) \leq 670 - 50000 \times \text{sol.B} \quad \text{formula (1),}$$

wherein sol. B is calculated as 0 when sol. B≤0.

It is understood from FIG. 1 that a CT range where TS becomes stable is present corresponding to sol. B estimated by the formula (A), and a proper range is shifted to a lower temperature along with the increase of sol. B. It is also understood that the boundary is given by the formula (1), and by coiling the sheets having various composition steels at a temperature lower than CT in the formula, fluctuations in the mechanical properties can be suppressed in B-added steels. From the above, CT is limited to the range expressed by the formula (1).

FIG. 2 shows a change in TS in the widthwise direction when CT is set to 620° C. and 530° C. with respect to steel 1. It is understood that even among steels having the same steel composition, a remarkable change in mechanical properties occurs when CT is not properly set. Here, with respect to the coil where a change in strength of 20 MPa or more occurs in the widthwise direction, carbide particles having an aspect ratio of 3.0 or less and a diameter of 0.25 to 0.90 µm were recognized in excess of 10000 pieces/mm².

To acquire beautiful plating surface quality for an outer panel, it is desirable that a slab heating temperature is set to 1250° C. or below, descaling for removing primary and secondary scales generated on a surface of a steel sheet is sufficiently performed, a rough rolling completion temperature is set to 1080° C. or below, and a finish rolling temperature is set to 900° C. or below. For example, in conventional steel where Cr content was 0.40% or more, primary scales generated at the time of heating a slab are liable to remain even after rolling thus causing the deterioration of appearance quality after annealing in CAL or CGL. However, by decreasing Cr to less than 0.35%, by setting the slab heating temperature to 1250° C. or below, by sufficiently performing descaling with a high pressure spray, and by controlling the rough rolling completion temperature to 1080° C. or below and the finish rolling temperature to 900° C. or below, the steel sheet can acquire beautiful appearance quality necessary for an outer panel of an automobile.

Cold Rolling:

In cold rolling, a cold-rolled reduction may be set to 50 to 85%. From a viewpoint of improving deep drawing property by improving r values, the cold-rolled reduction is preferably set to 65 to 73%. From a viewpoint of decreasing the r value and in-plane anisotropy of YP, the cold-rolled reduction is preferably set to 70 to 85%.

Annealing:

To a steel sheet after cold rolling, in CGL or CAL, annealing is applied and, galvanizing treatment is applied or alloying treatment is further applied after galvanizing treatment when necessary. An annealing temperature is set to 740° C. or above and 830° C. or below. When the annealing temperature is less than 740° C., solid solution of carbide becomes insufficient and hence, a volume fraction of a second phase cannot be ensured stably. When the annealing temperature exceeds 830° C., pearlite and bainite are liable to be generated and hence, a steel sheet cannot acquire sufficiently low YP. From a viewpoint of bringing carbide into a solid solution state, a holding time during annealing is set to 25 sec or more, and is more preferably set to 40 sec or more, while from a viewpoint of ensuring productivity, the holding time during soaking is preferably set to 300 sec or less.

After soaking, the steel sheet may be cooled down at a cooling rate of 2 to 200° C./sec within a temperature range of the annealing temperature to 480° C., and the cooling rate is preferably set to 3 to 50° C./sec from a viewpoint of acquiring low YP.

Thereafter, galvanizing is performed by immersing a steel sheet in a galvanizing bath in CGL. However, when necessary, alloying treatment can be also applied to the steel sheet by further holding the steel sheet within a temperature range of 470 to 650° C. within 40 sec. After galvanizing or after alloying treatment when the alloying treatment is performed, from a viewpoint of acquiring low YP by suppressing the generation of bainite, the steel sheet is preferably cooled down in a temperature range to 100° C. or below at an average cooling rate of 5 to 200° C./sec.

In CAL, the steel sheet may be cooled down from 480° C. to a room temperature at an average cooling rate of 2 to 200° C./sec. In case of a furnace which includes an overaging zone, the steel sheet may be cooled down to 370° C. or below at an average cooling rate of 5 to 200° C./sec and, thereafter, to 100° C. or below at an average cooling rate of 0.1 to 200° C./sec.

Skin pass rolling can be applied to the obtained galvanized steel sheet or cold-rolled steel sheet from a viewpoint of stabilizing press formability such as the adjustment of surface roughness and leveling of a plate shape. In this case, a skin pass elongation ratio is preferably set to 0.1 to 0.6% from a viewpoint of acquiring low YP and high El.

[Embodiment]

Molten steels having steel numbers A to U shown in Table 2 were made, and the molten steels are formed into slabs having a thickness of 230 mm by continuous casting.

TABLE 2

| steel No. | C | Si | Mn | P | S | sol.Al | N | Cr | Mo | Ti | B | B* | others | [Mneq] | remarks |
|---|---|---|---|---|---|---|---|---|---|---|---|---|---|---|---|
| A | 0.021 | 0.02 | 1.74 | 0.026 | 0.008 | 0.070 | 0.0032 | 0.18 | 0.00 | 0.006 | 0.0019 | 0.0022 | — | 2.51 | Invention steel |
| B | 0.020 | 0.01 | 1.76 | 0.030 | 0.005 | 0.082 | 0.0027 | 0.20 | 0.00 | 0.005 | 0.0010 | 0.0022 | Nb: 0.005 | 2.59 | Invention steel |
| C | 0.023 | 0.01 | 1.72 | 0.025 | 0.002 | 0.050 | 0.0020 | 0.21 | 0.01 | 0.000 | 0.0013 | 0.0018 | Ca: 0.0005, Sb: 0.005 | 2.50 | Invention steel |
| D | 0.030 | 0.01 | 1.65 | 0.014 | 0.003 | 0.016 | 0.0020 | 0.31 | 0.00 | 0.004 | 0.0015 | 0.0022 | Cu: 0.01, Ni: 0.01 | 2.50 | Invention steel |
| E | 0.027 | 0.01 | 1.60 | 0.032 | 0.002 | 0.220 | 0.0034 | 0.20 | 0.01 | 0.000 | 0.0013 | 0.0022 | Ce: 0.0005 | 2.48 | Invention steel |
| F | 0.030 | 0.01 | 1.60 | 0.011 | 0.004 | 0.050 | 0.0025 | 0.14 | 0.01 | 0.004 | 0.0015 | 0.0022 | Sn: 0.0005 | 2.23 | Invention steel |
| G | 0.029 | 0.01 | 1.60 | 0.010 | 0.005 | 0.048 | 0.0029 | 0.10 | 0.00 | 0.004 | 0.0015 | 0.0022 | Ca: 0.005, Sn: 0.01 | 2.14 | Invention steel |
| H | 0.065 | 0.01 | 1.68 | 0.020 | 0.004 | 0.060 | 0.0030 | 0.19 | 0.00 | 0.004 | 0.0018 | 0.0022 | W: 0.002, V: 0.01 | 2.42 | Invention steel |
| I | 0.040 | 0.01 | 1.55 | 0.032 | 0.004 | 0.050 | 0.0042 | 0.20 | 0.00 | 0.019 | 0.0010 | 0.0022 | V: 0.002, Nb: 0.002 | 2.40 | Invention steel |
| J | 0.095 | 0.15 | 1.72 | 0.035 | 0.002 | 0.060 | 0.0030 | 0.26 | 0.05 | 0.015 | 0.0013 | 0.0022 | La: 0.0005, Mg: 0.0005 | 2.83 | Invention steel |
| K | 0.028 | 0.00 | 1.80 | 0.035 | 0.002 | 0.060 | 0.0035 | 0.01 | 0.00 | 0.000 | 0.0028 | 0.0022 | Ce: 0.0008, Sb: 0.0005 | 2.42 | Invention steel |
| L | 0.028 | 0.01 | 1.70 | 0.035 | 0.002 | 0.071 | 0.0035 | 0.05 | 0.00 | 0.000 | 0.0028 | 0.0022 | Cu: 0.12, Ni: 0.15 | 2.38 | Invention steel |
| M | 0.029 | 0.01 | 1.99 | 0.019 | 0.005 | 0.05 | 0.0030 | 0.12 | 0.04 | 0.006 | 0 | 0.0000 | — | 2.43 | comparison steel |
| N | 0.025 | 0.01 | 1.51 | 0.013 | 0.002 | 0.04 | 0.0033 | 0.18 | 0 | 0 | 0.0005 | 0.0009 | — | 1.98 | comparison steel |
| O | 0.025 | 0.01 | 1.8 | 0.020 | 0.003 | 0.052 | 0.003 | 0.49 | 0 | 0.002 | 0.0010 | 0.0019 | — | 2.89 | comparison steel |
| P | 0.028 | 0.01 | 1.6 | 0.015 | 0.005 | 0.04 | 0.0025 | 0.62 | 0 | 0 | 0.0010 | 0.0014 | — | 2.74 | comparison steel |
| Q | 0.03 | 0.01 | 1.6 | 0.030 | 0.004 | 0.032 | 0.0065 | 0.12 | 0 | 0 | 0.0015 | 0.0018 | — | 2.27 | comparison steel |
| R | 0.018 | 0.01 | 2.3 | 0.020 | 0.002 | 0.05 | 0.0035 | 0.18 | 0 | 0.004 | 0.0020 | 0.0022 | — | 3.02 | comparison steel |
| S | 0.031 | 0.01 | 2.3 | 0.021 | 0.002 | 0.05 | 0.0032 | 0.18 | 0 | 0.006 | 0.0018 | 0.0022 | — | 3.03 | comparison steel |
| T | 0.075 | 0.01 | 2.3 | 0.020 | 0.002 | 0.05 | 0.0032 | 0.18 | 0 | 0.005 | 0.0019 | 0.0022 | — | 3.02 | comparison steel |
| U | 0.023 | 0.01 | 1.5 | 0.023 | 0.002 | 0.05 | 0.0032 | 0.18 | 0.25 | 0.005 | 0.0014 | 0.0022 | — | 3.07 | comparison steel |

The slab was heated at a temperature of 1180 to 1250° C. and, thereafter, hot rolling was applied to the slab at a finish rolling temperature which falls within a range of 820 to 900° C. Thereafter, the hot-rolled steel sheet was cooled down at an average cooled rate of 15 to 35° C./sec, and the hot-rolled steel sheet was coiled within a temperature range of 450 to 670° C. The obtained hot-rolled sheet was subjected to cold rolling at a cold-rolled reduction of 70 to 77% thus forming a cold-rolled sheet having a sheet thickness of 0.8 mm.

The obtained cold-rolled sheet was annealed, as shown in Table 3, at an annealing temperature AT in CGL or CAL. Here, annealing was performed such that a holding time of a temperature range of 740° C. or above becomes 15 to 150 sec, and the cold-rolled sheet was cooled such that an average cooling rate from the annealing temperature AT to 480° C. becomes 10° C./sec. Thereafter, in CGL, the hot rolled sheet was immersed into galvanizing bath so that the hot rolled sheet was galvanized, and alloying treatment was applied to the hot rolled sheet. After alloying treatment or after galvanizing when alloying treatment is not performed after galvanizing, the hot-rolled sheet was cooled to 100° C. or below such that the average cooling rate from a plating bath temperature to 100° C. becomes 25° C./sec. Galvanizing was carried out at a bath temperature of 460° C. with 0.13% Al in the bath, while alloying treatment was performed such that after immersing the cold-rolled sheet in a plating bath, the cold-rolled sheet was heated to 480 to 540° C. at an average heating rate of 15° C./sec, and held for 10 to 25 sec so that the content of Fe in plating falls within a range of 9.5 to 11.5%. A plating adhesion quantity is set to 45 g/m² per one side and plating was applied to both surfaces of the sheet. In CAL, the cold-rolled sheet was cooled such that an average cooling rate within a temperature range from 480° C. to 370° C. becomes 10° C./sec and, thereafter, the hot-rolled sheet was cooled down to 100° C. at an average cooling rate of 1° C./sec in an overaging zone, and the cold-rolled sheet was further cooled to a room temperature at an average cooling rate of 10° C./sec. A skin-pass rolling with an elongation of 0.4% was applied to the obtained galvanized steel sheet and cold-rolled steel sheet, and samples were taken from these steel sheets.

With respect to the obtained samples, a volume fraction of a second phase, a ratio between total volume fractions of martensite and retained γ to the volume fraction of second phase (a ratio of martensite and retained γ in the second phase), and the number of carbide particles which are present in ferrite grains and have an aspect ratio of 3.0 or less and a diameter of 0.25 to 0.90 μm (in-grain carbide density) were investigated in the manner as described above. Further, types of steel microstructures were identified by the SEM observation. Further, JIS No. 5 tensile specimens were sampled in the rolling direction and the direction orthogonal to the rolling direction and a tensile test (in accordance with JIS 22241) is carried out on the specimens, YP (yield strength), TS (tensile strength), YR (yield ratio), and El (total elongation) were evaluated. Further, JIS No. 5 specimens were sampled parallel to the rolling direction in the coil widthwise direction, and a change amount in TS (ΔTS) in the coil widthwise direction was investigated.

Further, BH which is an increment of YP after applying heat treatment at a temperature of 170° C. for 20 minutes with respect to a stress when a pre-strain of 2% was given to the same specimen (JIS No. 5 tensile specimen) as the above-mentioned specimen was obtained.

Further, the chipping resistance of respective steel sheets was evaluated. That is, chemical conversion treatment and electro-deposition coating were applied to the obtained steel sheets and, thereafter, 500 g of broken stones stipulated in JIS-A5001 S-13 (6) were sprayed to the steel sheets under a condition of injection pressure of 490 kPa (5 kgf/cm²) and, thereafter, a corrosion test was carried out by a JASO-CCT corrosion cycle test. An electro-deposition coating film thickness was set to 20 μm. A corrosive product was removed from a corrosion sample after a lapse of 90 cycles with respect to the galvanized steel sheet (manufactured by CGL), while a corrosive product was removed from a corrosion sample after a lapse of 30 cycles with respect to the cold-rolled steel sheet (manufactured by CAL). Then, a maximum thickness loss of the sheet from an original thickness was measured and set as a maximum corrosion depth.

The result of the test is shown in Table 3.

TABLE 3

| steel No. | hot rolling condition CT (°C) | annealing condition annealing furnace | AT (°C) | holding time (sec) | sol. B | right side of formula (1)* | microstructure volume fraction (%) of second phase | ratio (%) of martensite and residual γ in second phase | Volume fraction (%) of ferrite | kind of micro-structure** | in-grain carbide density (pieces/mm²) | mechanical property YP (MPa) | TS (MPa) | YR (%) | BH (MPa) | El (%) | TS × El (MPa × %) | ΔTS (MPa) | maximum corrosion depth (mm) | remarks |
|---|---|---|---|---|---|---|---|---|---|---|---|---|---|---|---|---|---|---|---|---|
| A | 450 | CGL | 785 | 40 | 0.0005 | 644 | 4.0 | 100 | 96.0 | F + M/γ | 3100 | 238 | 455 | 52 | 61 | 36.9 | 16790 | 10 | 0.32 | invention example |
|  | 530 | CGL | 785 | 40 | 0.0005 | 644 | 4.0 | 100 | 95.9 | F + M/γ | 3500 | 234 | 453 | 52 | 60 | 36.8 | 16670 | 8 | 0.34 | invention example |
|  | 530 | CGL | 815 | 40 | 0.0005 | 644 | 4.7 | 90 | 95.3 | F + M/γ | 2500 | 250 | 464 | 54 | 60 | 36.8 | 17075 | 8 | 0.34 | invention example |
|  | 530 | CGL | 865 | 40 | 0.0010 | 644 | 4.7 | 58 | 95.2 | F + M/γ + B | 3200 | 258 | 462 | 56 | 58 | 34.6 | 15985 | 15 | 0.34 | comparison example |
|  | 598 | CGL | 785 | 40 | 0.0014 | 618 | 3.5 | 100 | 96.4 | F + M/γ | 6200 | 231 | 450 | 51 | 62 | 36.9 | 16605 | 32 | 0.33 | invention example |
|  | 620 | CGL | 785 | 40 | 0.0011 | 602 | 1.8 | 100 | 97.9 | F + M/γ | 18000 | 257 | 431 | 60 | 62 | 37.5 | 16163 | 21 | 0.32 | comparison example |
|  | 600 | CGL | 740 | 18 | 0.0011 | 616 | 1.0 | 100 | 98.5 | F + M/γ | 29000 | 263 | 420 | 63 | 60 | 38.0 | 15960 | 17 | 0.32 | invention example |
|  | 600 | CGL | 770 | 40 | 0.0001 | 616 | 3.0 | 100 | 96.9 | F + M/γ | 8000 | 232 | 443 | 52 | 61 | 37.6 | 16657 | 19 | 0.33 | invention example |
|  | 600 | CGL | 780 | 30 | 0.0011 | 616 | 2.5 | 100 | 97.4 | F + M/γ | 8800 | 231 | 440 | 53 | 62 | 37.5 | 16500 | 25 | 0.34 | invention example |
|  | 600 | CGL | 770 | 15 | 0.0011 | 616 | 1.4 | 100 | 98.2 | F + M/γ | 24000 | 258 | 424 | 61 | 62 | 37.8 | 16027 | 9 | 0.32 | comparison example |
| B | 530 | CGL | 770 | 70 | 0.0000 | 670 | 3.8 | 100 | 96.2 | F + M/γ | 2500 | 248 | 462 | 54 | 57 | 35.7 | 16493 | 30 | 0.35 | invention example |
|  | 640 | CGL | 770 | 70 | 0.0010 | 620 | 1.7 | 100 | 98.0 | F + M/γ | 17000 | 265 | 432 | 61 | 58 | 36.4 | 15725 | 10 | 0.34 | comparison example |
| C | 550 | CGL | 770 | 40 | 0.0000 | 670 | 4.0 | 100 | 96.0 | F + M/γ | 2800 | 232 | 460 | 50 | 62 | 36.0 | 16560 | 9 | 0.31 | invention example |
|  | 550 | CAL | 750 | 80 | 0.0000 | 670 | 4.9 | 95 | 95.0 | F + M/γ + B | 3500 | 245 | 464 | 53 | 63 | 36.2 | 16797 | 12 | 0.31 | invention example |
| D | 490 | CGL | 780 | 50 | 0.0007 | 636 | 5.8 | 100 | 94.1 | F + M/γ | 3500 | 247 | 483 | 51 | 60 | 35.2 | 17002 | 38 | 0.35 | invention example |
|  | 640 | CGL | 780 | 50 | 0.0009 | 623 | 1.9 | 100 | 97.7 | F + M/γ | 25000 | 271 | 445 | 61 | 64 | 36.5 | 16243 | 9 | 0.34 | comparison example |
| E | 595 | CAL | 760 | 50 | 0.0002 | 659 | 4.8 | 95 | 95.1 | F + M/γ + B | 4400 | 240 | 472 | 51 | 60 | 35.4 | 16709 | 37 | 0.32 | invention example |
|  | 595 | CAL | 760 | 15 | 0.0002 | 659 | 1.8 | 90 | 97.9 | F + M/γ + B | 16000 | 264 | 438 | 60 | 62 | 36.2 | 15856 | 10 | 0.32 | comparison example |
| F | 540 | CGL | 770 | 80 | 0.0003 | 655 | 4.6 | 85 | 95.4 | F + M/γ + B | 2800 | 240 | 456 | 53 | 60 | 35.9 | 16370 | 10 | 0.33 | invention example |
|  | 540 | CGL | 840 | 80 | 0.0003 | 655 | 4.5 | 48 | 95.5 | F + M/γ + P + B | 2400 | 262 | 460 | 57 | 60 | 34.6 | 15916 | 10 | 0.33 | comparison example |
| G | 500 | CGL | 770 | 80 | 0.0000 | 670 | 4.5 | 65 | 95.4 | F + M/γ + P + B | 4400 | 246 | 452 | 54 | 57 | 35.4 | 16001 | 10 | 0.29 | invention example |

TABLE 3-continued

| steel No. | hot rolling condition CT (°C.) | annealing condition annealing furnace | AT (°C.) | holding time (sec) | sol. B | right side of formula (1) * | microstructure volume fraction (%) of second phase | ratio (%) of martensite and residual γ in second phase | Volume fraction (%) of ferrite | kind of micro-structure ** | in-grain carbide density (pieces/mm²) | mechanical property YP (MPa) | TS (MPa) | YR (%) | BH (MPa) | El (%) | TS × El (MPa × %) | ΔTS (MPa) | maximum corrosion depth (mm) | remarks |
|---|---|---|---|---|---|---|---|---|---|---|---|---|---|---|---|---|---|---|---|---|
| H | 470 | CGL | 780 | 50 | 0.0002 | 660 | 8.7 | 97 | 91.3 | F + M/γ + B | 2400 | 291 | 550 | 53 | 52 | 31.3 | 17215 | 15 | 0.34 | invention example |
| I | 520 | CGL | 780 | 50 | 0.0010 | 620 | 6.4 | 95 | 93.6 | F + M/γ + B | 2800 | 272 | 520 | 52 | 57 | 33.0 | 17160 | 11 | 0.34 | invention example |
| J | 500 | CGL | 800 | 50 | 0.0013 | 605 | 11.4 | 100 | 88.5 | F + M/γ | 3200 | 308 | 595 | 52 | 51 | 29.5 | 17553 | 15 | 0.38 | invention example |
| K | 510 | CGL | 780 | 40 | 0.0001 | 665 | 4.0 | 91 | 96.0 | F + M/γ + B | 3000 | 242 | 458 | 53 | 57 | 36.0 | 16488 | 17 | 0.3 | comparison example |
|  | 670 | CGL | 780 | 40 | 0.0014 | 599 | 1.4 | 91 | 98.2 | F + M/γ + B | 28000 | 281 | 421 | 67 | 57 | 36.0 | 15156 | 38 | 0.31 | comparison example |
| L | 520 | CGL | 770 | 50 | 0.0001 | 665 | 3.8 | 88 | 96.1 | F + M/γ + B | 4000 | 231 | 448 | 52 | 62 | 37.0 | 16576 | 15 | 0.29 | invention example |
| M | 520 | CGL | 770 | 40 | 0.0000 | 670 | 4.2 | 95 | 95.7 | F + M/γ + B | 3800 | 255 | 458 | 56 | 49 | 35.0 | 16030 | 18 | 0.34 | comparison example |
|  | 640 | CCL | 770 | 40 | 0.0000 | 670 | 4.4 | 96 | 95.5 | F + M/γ + B | 3500 | 253 | 455 | 56 | 48 | 35.5 | 16153 | 14 | 0.34 | comparison example |
| N | 520 | CGL | 770 | 40 | 0.0000 | 670 | 3.8 | 58 | 96.1 | F + M/γ + P + B | 5400 | 258 | 431 | 60 | 49 | 35.9 | 15473 | 10 | 0.34 | comparison example |
| O | 530 | CGL | 770 | 50 | 0.0000 | 670 | 4.6 | 100 | 95.4 | F + M/γ | 1600 | 237 | 455 | 52 | 56 | 36.8 | 16744 | 5 | 0.59 | comparison example |
|  | 530 | CAL | 760 | 70 | 0.0000 | 670 | 4.9 | 100 | 95.1 | F + M/γ | 1400 | 240 | 463 | 52 | 58 | 36.8 | 17038 | 5 | 0.62 | comparison example |
| P | 530 | CGL | 770 | 50 | 0.0000 | 670 | 4.3 | 100 | 95.7 | F + M/γ | 1300 | 229 | 452 | 51 | 65 | 38.0 | 17176 | 6 | 0.75 | comparison example |
| Q | 520 | CGL | 780 | 60 | 0.0000 | 670 | 5.1 | 81 | 94.8 | F + M/γ + P + B | 5400 | 264 | 483 | 55 | 42 | 33.0 | 15939 | 16 | 0.33 | comparison example |
| R | 510 | CGL | 770 | 50 | 0.0000 | 669 | 4.1 | 100 | 95.8 | F + M/γ | 5500 | 253 | 455 | 56 | 48 | 35.0 | 15925 | 8 | 0.35 | comparison example |
|  | 590 | CGL | 770 | 50 | 0.0020 | 570 | 2.5 | 100 | 97.3 | F + M/γ | 12000 | 242 | 440 | 55 | 48 | 36.2 | 15928 | 25 | 0.34 | comparison example |
|  | 640 | CGL | 770 | 50 | 0.0020 | 570 | 1.4 | 100 | 98.2 | F + M/γ | 27000 | 269 | 421 | 64 | 47 | 37.3 | 15703 | 38 | 0.33 | comparison example |
| S | 520 | CGL | 780 | 50 | 0.0004 | 649 | 6.5 | 100 | 93.4 | F + M/γ | 6800 | 305 | 505 | 60 | 43 | 31.5 | 15908 | 15 | 0.34 | comparison example |
| T | 510 | CGL | 800 | 60 | 0.0003 | 653 | 10.9 | 100 | 89.0 | F + M/γ | 6600 | 335 | 602 | 56 | 43 | 28.0 | 16856 | 18 | 0.33 | comparison example |
| U | 510 | CGL | 780 | 50 | 0.0000 | 670 | 4.7 | 100 | 95.3 | F + M/γ | 2400 | 255 | 462 | 55 | 60 | 33.5 | 15477 | 15 | 0.33 | comparison example |

*: right side of formula (1) = 670-50000 × sol. B
**: kind of microstructure (excluding in-grain carbide) F: ferrite, M/γ: martensite or retained austenite, P: pearlite and B: bainite In the steel sheet of the present invention, compared with the conventional steel where the content of Cr is not properly set, a thickness loss due to corrosion of the steel sheet is remarkably decreased.

Compared with the steel sheet which contains a small amount of B, a low equivalent amount of Mn and a large amount of Mn and Mo are added, the steel sheet of the present invention exhibits high El and high BH while exhibiting low YP at the same TS, that is, low YR.

That is, in the conventional steel O and steel P to which a large amount of Cr is added, a corrosion reduction amount (maximum corrosion depth) is remarkably large, that is, 0.59 to 0.75 mm. When such steel is used for an actual part, a pitting lifetime of the actual part is lowered by 30 to 50% and hence, the use of the steel as a material of an outer panel is difficult. To the contrary, in embodiments of the present invention steel, a maximum corrosion reduction amount is 0.29 to 0.38 mm and hence, the maximum corrosion reduction amount is largely decreased. Although not shown in Table, the evaluation of the corrosion resistance was carried out also with respect to the conventional 340BH, and the corrosion reduction amount was 0.36 mm. The chemical composition of this steel (conventional 340BH) contains by mass % 0.002% C, 0.01% Si, 0.4% Mn, 0.05% P, 0.008% S, 0.04% Cr, 0.06% sol.Al, 0.01% Nb, 0.0018% N and 0.0008% B. In this manner, it is understood that the present invention steels have the substantially equal chipping resistance as the conventional steel. Among the present invention steels, the steel where the content of Cr is set to less than 0.30% and the steel to which Ce, Ca, La, Cu, Ni are added in a complex manner exhibit more preferable chipping resistance.

In this manner, among the steels where the content of Cr is reduced, the steels where the Mn equivalent, the amount of Mn, B, the coiling temperature, the annealing temperature or the annealing (holding) time were controlled can also suppress the generation of pearlite and bainite, and also decreases the generation of carbides in ferrite grains and hence, changes in mechanical properties in the coil can be suppressed. That is, among the steels A to L, the steels where CT is set to a condition below a value of the formula (1) and the annealing temperature and the holding time fall within predetermined ranges have low YP, high BH, high El and small ΔTS compared to comparison steels at the same TS level.

According to the present invention, a high strength steel sheet which exhibits excellent chipping resistance, low YP, high El and high BH and, further, a small change in mechanical properties in a coil can be manufactured at a low cost.

The high strength steel sheet of the present invention exhibits all of the excellent chipping resistance, the excellent surface distortion resistance, the excellent stretch-formability and the excellent stability of mechanical properties and hence, the high strength steel sheet of the present invention can realize the strengthening and the reduction of thickness of automobile parts.

The invention claimed is:

1. A high strength steel sheet comprising:
   steel having the composition containing by mass % over 0.015% and less than 0.100% C, less than 0.50% Si, over 1.0% and less than 2.0% Mn, 0.05% or less P, 0.03% or less S, 0.01% or more and 0.3% or less sol. Al, 0.005% or less N, less than 0.35% Cr, 0.0010% or more and 0.0050% or less B, less than 0.15% Mo, less than 0.030% Ti, and iron and unavoidable impurities as a balance, wherein the steel satisfies 2.1≤[Mneq]≤3.1,
   wherein the microstructure of the steel includes:
   a ferrite and a second phase,
   a volume fraction of the second phase is set to 2.0 to 12.0%,
   a ratio of total volume fraction of martensite and retained γ to the volume fraction of second phase is 60% or more, and
   the number of carbide particles which are present within ferrite particles, have an aspect ratio of 3.0 or less and have a diameter of 0.25 to 0.90 μm is set to 10000 pieces/mm² or less,
   wherein:

[Mneq]=[% Mn]+1.3[% Cr]+3.3[% Mo]+8[% P]+150B*,

B*=[% B]+[% Ti]/48×10.8×0.9+[% Al]/27×10.8× 0.025,

[% Mn], [% Cr], [% Mo], [% P], [% B], [% Ti] and [% Al] indicate contents of Mn, Cr, Mo, P, B, Ti and sol.Al respectively, and
   B*=0.0022 when B* satisfies B*≥0.0022.

2. The high strength steel sheet according to claim 1, wherein the steel further contains by mass % at least one component selected from a group consisting of 0.2% or less Sn, 0.2% or less Sb, 0.5% or less Cu, 0.5% or less Ni, 0.01% or less Ca, 0.01% or less Ce, 0.01% or less La and 0.01% or less Mg.

3. The high strength steel sheet according to claim 1, wherein the steel further contains by mass % at least one component selected from a group consisting of less than 0.030% Nb, 0.2% or less V, 0.15% or less W and 0.1% or less Zr.

4. The high strength steel sheet according to claim 3, wherein the steel further contains by mass % at least one component selected from a group consisting of 0.2% or less Sn, 0.2% or less Sb, 0.5% or less Cu, 0.5% or less Ni, 0.01% or less Ca, 0.01% or less Ce, 0.01% or less La and 0.01% or less Mg.

5. A method for manufacturing a high strength steel sheet, wherein in a step of hot-rolling a steel slab having the composition described in claim 1,
   a coiling temperature CT is controlled within a range expressed by a formula (1) corresponding to sol. B and,
   after performing cold rolling at a cold rolling reduction of 50 to 85%, and in a continuous galvanizing and galvannealing line (CGL) or continuous annealing line (CAL), annealing is performed by holding a cold-rolled sheet at an annealing temperature of 740° C. or above and 830° C. or below for 25 seconds or more, wherein CT(° C.)≤670−50000×sol.B          formula (1)

sol.B=[% B]−{[% N]/14−[% Ti]/48×0.8−[% Al]/27× 0.0005×(CT−560)}×10.8          formula (A),

[% B], [% N], [% Ti], and [% Al] indicate contents of B, N, Ti and sol. Al respectively, and CT indicates a coiling temperature (° C.),
   when CT−560≤0, CT−560 is assumed as 0, and
   the calculation is made by assuming sol. B as 0 when sol. B≤0.

6. A method for manufacturing a high strength steel sheet, wherein in a step of hot-rolling a steel slab having the composition described in claim 2,
   a coiling temperature CT is controlled within a range expressed by a formula (1) corresponding to sol. B and, after performing cold rolling at a cold rolling reduction of 50 to 85%, and in a continuous galvanizing and galvannealing line (CGL) or continuous annealing line (CAL), annealing is performed by holding a cold-rolled sheet at an annealing temperature of 740° C. or above and 830° C. or below for 25 seconds or more, wherein $$CT(° C.) \leq 670 - 50000 \times sol.B \qquad \text{formula (1)}$$

$$sol.B = [\% B] - \{[\% N]/14 - [\% Ti]/48 \times 0.8 - [\% Al]/27 \times 0.0005 \times (CT-560)\} \times 10.8 \qquad \text{formula (A),}$$

[% B], [% N], [% Ti], and [% Al] indicate contents of B, N, Ti and sol. Al respectively, and CT indicates a coiling temperature (° C.), when CT−560≤0, CT−560 is assumed as 0, and the calculation is made by assuming sol. B as 0 when sol. B≤0.

7. A method for manufacturing a high strength steel sheet, wherein in a step of hot-rolling a steel slab having the composition described in claim 3, a coiling temperature CT is controlled within a range expressed by a formula (1) corresponding to sol. B and, after performing cold rolling at a cold rolling reduction of 50 to 85%, and in a continuous galvanizing and galvannealing line (CGL) or continuous annealing line (CAL), annealing is performed by holding a cold-rolled sheet at an annealing temperature of 740° C. or above and 830° C. or below for 25 seconds or more, wherein $$CT(° C.) \leq 670 - 50000 \times sol.B \qquad \text{formula (1)}$$

$$sol.B = [\% B] - \{[\% N]/14 - [\% Ti]/48 \times 0.8 - [\% Al]/27 \times 0.0005 \times (CT-560)\} \times 10.8 \qquad \text{formula (A),}$$

[% B], [% N], [% Ti], and [% Al] indicate contents of B, N, Ti and sol. Al respectively, and CT indicates a coiling temperature (° C.), when CT−560≤0, CT−560 is assumed as 0, and the calculation is made by assuming sol. B as 0 when sol. B≤0.

8. A method for manufacturing a high strength steel sheet, wherein in a step of hot-rolling a steel slab having the composition described in claim 4, a coiling temperature CT is controlled within a range expressed by a formula (1) corresponding to sol. B and, after performing cold rolling at a cold rolling reduction of 50 to 85%, and in a continuous galvanizing and galvannealing line (CGL) or continuous annealing line (CAL), annealing is performed by holding a cold-rolled sheet at an annealing temperature of 740° C. or above and 830° C. or below for 25 seconds or more, wherein $$CT(° C.) \leq 670 - 50000 \times sol.B \qquad \text{formula (1)}$$

$$sol.B = [\% B] - \{[\% N]/14 - [\% Ti]/48 \times 0.8 - [\% Al]/27 \times 0.0005 \times (CT-560)\} \times 10.8 \qquad \text{formula (A),}$$

[% B], [% N], [% Ti], and [% Al] indicate contents of B, N, Ti and sol. Al respectively, and CT indicates a coiling temperature (° C.), when CT−560≤0, CT−560 is assumed as 0, and the calculation is made by assuming sol. B as 0 when sol. B≤0.

* * * * *